United States Patent
Della Vite

[15] 3,652,369
[45] Mar. 28, 1972

[54] BOTTLE FEEDING MACHINE

[72] Inventor: Romuald Rene Della Vite, 10 Rue Saint-Quentin, Nogent Sur Marne, France

[22] Filed: Oct. 28, 1969

[21] Appl. No.: 870,049

[30] Foreign Application Priority Data

Apr. 3, 1969    France.................................6910294

[52] U.S. Cl............................................156/566, 198/34 A
[51] Int. Cl.......................................B65c 9/02, B65g 47/26
[58] Field of Search..................156/566, 568, 571; 198/34 A

[56] References Cited

UNITED STATES PATENTS

| | | |
|---|---|---|
| 2,692,671 | 10/1954 | Day et al. .......................198/34 A UX |
| 2,768,656 | 10/1956 | Day et al. .......................198/34 A UX |
| 2,830,724 | 4/1958 | Manas................................156/568 X |
| 3,036,624 | 5/1962 | Carter...................................156/566 |
| 3,247,044 | 4/1966 | Pechmann .........................156/566 X |

*Primary Examiner*—Samuel Feinberg
*Assistant Examiner*—James M. Hanley
*Attorney*—Christen & Sabol

[57] ABSTRACT

A rotary screw conveyor system for moving bottles past a turret type labelling mechanism includes two axially aligned, but independently movably mounted, rotary bodies, so that bottles of varying diameter may be accommodated without jamming the mechanism.

11 Claims, 5 Drawing Figures

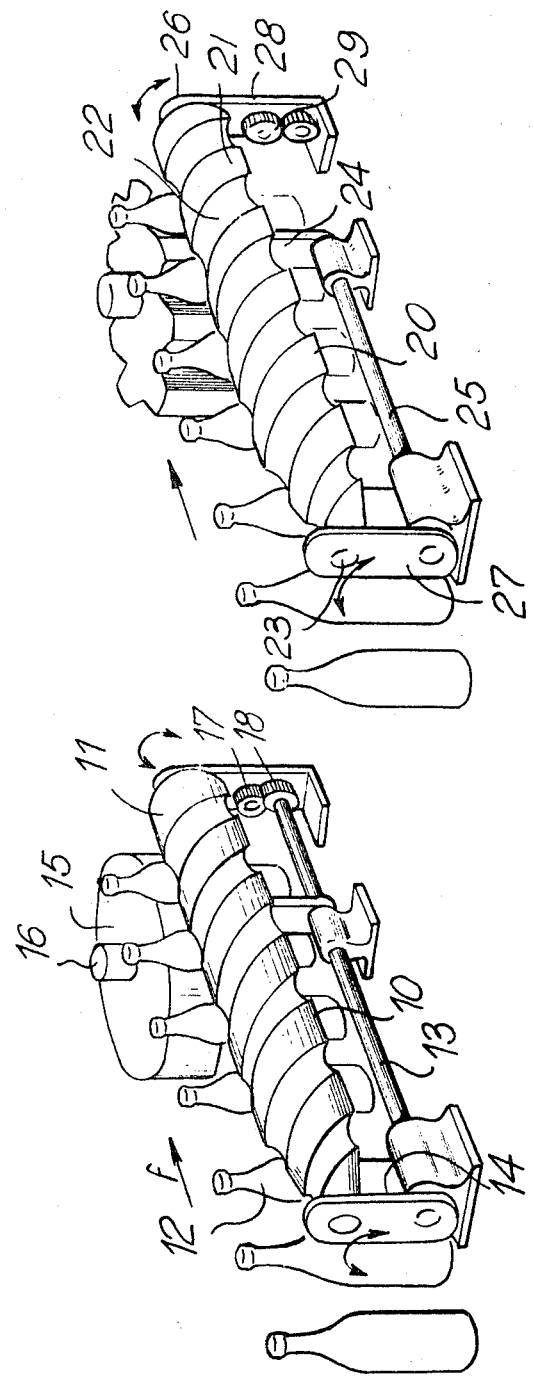

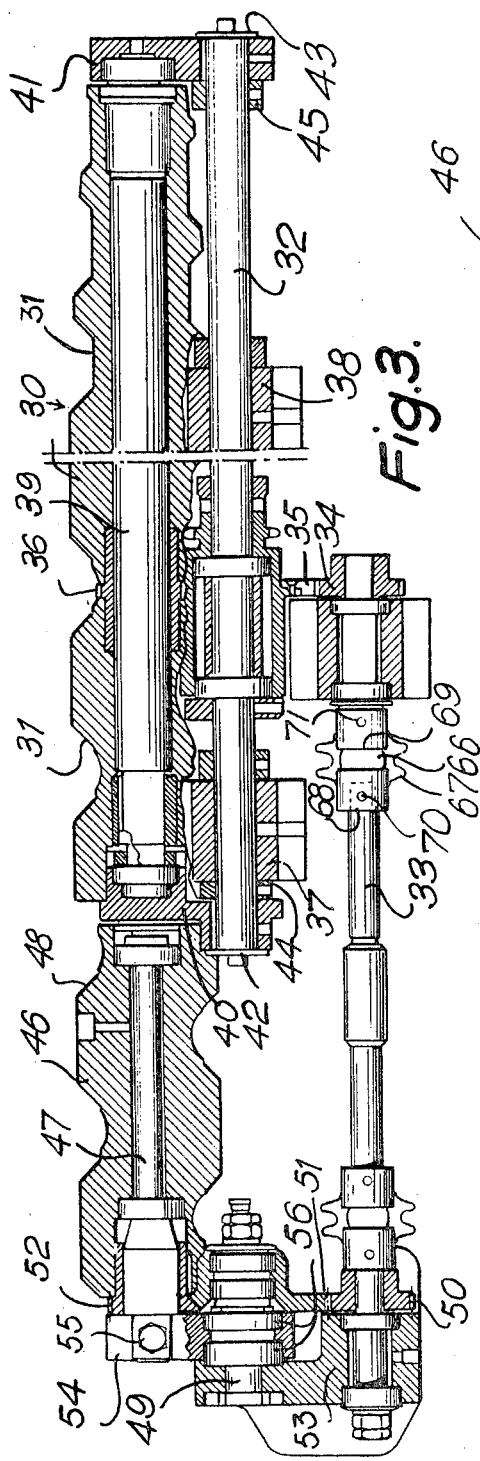
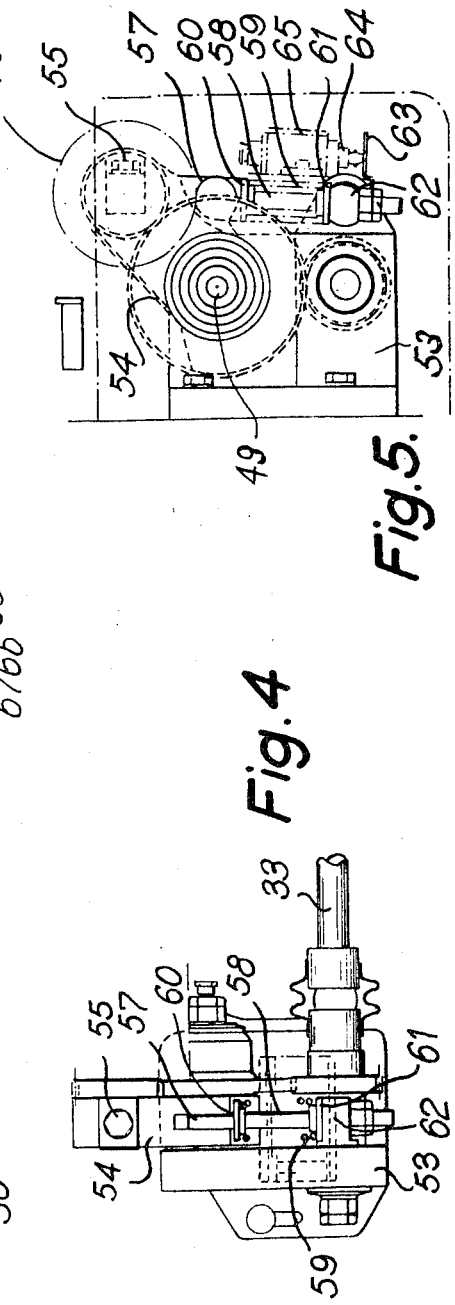

BOTTLE FEEDING MACHINE

It is known that in lines for preparing bottles filled with beverages or liquid foods, before they are shipped to the customer, at some point in the line they must be provided with labels.

This labeling operation is often performed by means of a rotating device known as a "turret," turning around a vertical shaft and on whose surface are regularly distributed recesses; each recess carries a label generally held by suction and with its adhesive face turned outward. When a bottle, brought upright by a conveyer belt, presents itself before and is pressed against a recess, the vacuum is broken, the recess and bottle separate, the bottle continues its travel provided with its label or labels. Such a system can function correctly only if the spacing between two successive bottles corresponds exactly to that of two horizontally adjacent recesses. Therefore, it is necessary to assure this regular spacing between the bottles before their passage before the turret.

There is known for this purpose a rotary screw conveyer system for moving the bottles: this conveyer can be made up of a sort of cylinder of plastic turning around its shaft parallel and adjacent to the belt; on this cylinder there may be hollowed out a helicoidal groove whose profile is such that each bottle held by the guard ramp can progressively engage therein and then be moved by the groove in rotation so that the spacing between two successive bottles is constant and equal to the pitch of the groove.

In known embodiments, this movement of the bottle stops before the turret, and the bottle, continuing its travel, is then pressed against the recess in question by another device, generally a counterroller or a sponge pad driven by an appropriate mechanism.

The present invention has for its object to cause the execution, simply by the conveyer system, of the two operations of guiding and then support of the bottles against the recesses, which has the advantage of maintaining the guiding of the bottle until it is provided with its labels. The difficulties of achieving such a system resulting from the necessity of compensation for the variation of the thickness of the bottles, have been solved by the applicant.

The present invention has for its object a rotating screw conveying device for guidance and support of the bottles moving upright on a conveyer belt along a guard ramp, at the time of labeling of these bottles by a turret with recesses, characterized in that the conveyer screw extends at least opposite to the place where the labels are put on by the turret, each end trunnion of the conveyer being able to recede elastically under the reaction of successive bottles. The elastic receding movement can be a movement of oscillation or an alternate movement of translation.

According to an embodiment with a movement of oscillation, the ends of the screw are carried by oscillating crank pins. The crank pin on the turret side can act on means for momentary cutting of the feed current of the device in case of too great oscillation due to a too thick bottle engaging in a recess of the turret.

According to a preferred arrangement of the invention, the conveyer screw is cut into two elements independent of one another, but adjacent and aligned without any noticable break of the helicoidal track of the screw passing from one element to the other, the element opposite the turret being mounted offset.

According to another advantageous arrangement of the invention, a universal joint and bellows diaphragm is placed between the body of the drive shaft of the screw, on the one hand, and each trunnion of this shaft with a toothed drive wheel of the screw, on the other hand, to assure all the necessary functioning flexibility.

Other arrangements pertaining to the invention will come out during the following description, with reference to the accompanying conveyor, in which:

FIG. 1 is a schematic perspective view of one form of the invention using only a single screw conveyer mounted on oscillating crank pins.

FIG. 2 is a schematic perspective view of another form of the invention with the screw conveyer comprising two elements, also with oscillating crank pins.

FIG. 3 is a lengthwise section in elevation of an embodiment of a screw conveyer having two elements, mounted on oscillating crank pins.

FIG. 4 is a side elevation of the mounting at the left end of FIG. 3.

FIG. 5 is an end view of this device from the left end of FIG. 3.

As represented by FIG. 1, a conveyer according to the invention comprises essentially a body 10, generally cylindrical, turning on its longitudinal axis; this body will preferably be of a resistant plastic but having a certain flexibility, such as, for example, polyamide or polytetrafluorethylene; on this body is hollowed out a helicoidal track 11 constituting the screw for moving and supporting bottles 12. This screw is placed parallel and a little above the conveyer belt (not shown) whose direction of movement is indicated by arrow $f$.

Opposite the right end of the screw is mounted a turret 15 with peripherally formed recesses turning around its vertical shaft 16 while the groove extends considerably beyond the turret so that each bottle is freed by the groove only after having received its labels.

Drive shaft 13, which is driven by a motor (not shown), is placed parallel to the body 10 and imparts movement to this body by a gear train 14.

To assure spacing guidance, and also support of the bottles against the recesses in the turret with compensating shifting of the body 10, depending on the variation in the thickness of these bottles, on each end of shaft 13 is placed a crank pin 17 for connecting with the corresponding screw shaft trunnion, which crank pins under the reaction of the bottles supported against the guard ramp (not shown) or recesses, makes possible compensation oscillation of body 10, the oscillation movement at one end being independent of that at the other end. A flexible connecting means 18, such as a universal joint and bellows diaphragm, permits shaft 13, on the one hand, to bear this play without undue reaction and, on the other hand, to assure by means of the diaphragm, the elastic return of the body 10 after an oscillation caused by a bottle.

However, this solution has the drawback, because of the reaction of the device during its functioning, of making the turret, which is a delicate element, support all the inertia of the body during its compensating oscillations.

It seems preferable to use the type of mounting shown schematically in FIG. 2.

The turning body is here formed by two elements 20 and 21, aligned on the same shaft and adjacent to one another, so that the path of the helicoidal track of the groove does not undergo any noticeable break in going from one element to the other; these two elements will also be made of resistant and flexible plastic. Guiding element 20 is longer and is mounted between two end bearings 23 and 24, which pivotally support crank pins 27 and 28, and is driven by shaft 25 at one of its ends. Guide and support element 21 is shorter, therefore has less inertia, and it is offset at one end on bearing 26; the means for driving body 21 in rotation are mounted in front of this bearing at 29. Although control in rotation of the two elements 20 and 21 are separate, their speed should be the same.

Numeral 27 indicates the crank pin which, under the reaction of the bottles supported against a guard ramp (not shown), permits the necessary compensating oscillations of element 20, and 28 indicates the equivalent crank pin for body 21 subjected to the reactions of the bottles engaging in the recesses of the turret.

An embodiment of the device according to the second principle is represented by FIGS. 3 to 5, and will now be described in detail, including the means of momentary stopping of the device when too thick a bottle accidentally arrives in front of the turret.

In FIG. 3, the bottles are assumed to be arriving from right to left along a guard ramp (not shown), and the two elements of the cylindrical body of the screw are shown in axial vertical section.

The initial guiding element is designated by 30, and 31 is the helicoidal track of the groove; it can be seen that the first grooves of this track are slightly lower and have a slightly different profile from that of the other grooves to facilitate the progressive engagement of the bottles in the helicoidal track.

Rotation of element 30 is performed in two stages, i.e., there is an intermediate shaft 32, equal in length to that of element 30, between body 30 and drive shaft 33; the transmission of movement is performed by a gear train with three toothed gears 34, 35, 36 with ball bearings on shafts 32 and 33; shaft 32 is supported by two intermediate bearings 37 and 38.

Intermediate shaft 39, for body 30, turns in two end bearings 40 and 41 which are provided with lower holes for the passage of the end trunions of shaft 32, each being mounted in the corresponding bearing hole between a cap 42, 43 and a ring 44, 45 respectively; this mounting plays the role of the crank pin 27 of FIG. 2. It can be seen that element 30 is made very solid with the intermediate shaft 39 and its oscillations are perfectly guided at the ends.

The rotating element 46 for support of the bottles against the recesses of the turret is shorter and is provided with shaft 47 mounted offset in roller bearings; helicoidal groove 48 of this element is the extension of helicoidal groove 31.

Driving of element 46 in rotation is also performed in two stages, by a very short intermediate shaft 49 turning at its ends on ball bearings, and driven by shaft 33; transmission of the movement is made by a gear train with three toothed gears 50, 51, 52; the intermediate shaft is also mounted offset in an upper hole of bearing block 53 in which the corresponding end of drive shaft 33 turns on ball bearings.

The oscillations of element 46 are made around intermediate shaft 49 by means of crank pin 54, clamped at 55 to the head of the trunnion of shaft 47, and able to oscillate around shaft 49 by roller bearing 56.

It is necessary to avoid any interference between the independent oscillations of the two elements 30 and 46 of the conveyer and to assure the elastic return of each element after an oscillation caused by a bottle with too large a diameter. For this purpose, drive shaft 33 is connected to each of its end trunnions with their gear trains by a universal joint 66 and bellows diaphragm 67 connected to the shaft and each trunnion by a sleeve 68 and 69 keyed at 70 and 71.

Driving of the two elements 30 and 46 in rotation is thus performed uniformly without oscillation reactions being transferred from one to the other.

In addition, when an element is shoved by a bottle with too great a diameter, the corresponding bellows diaphragm undergoes a slight torsion which assures the elastic return of the element after passage of the bottle.

FIGS. 4 and 5 show the system for cutting off the feed current of the device on which crank pin 54 acts, when too thick a bottle tends to cause too great an oscillation.

In FIG. 5 the extreme positions of element 46 are about 15° on both sides of the rest position.

The system for cutting off the current, for temporary stopping of the operation of the device, comprises a sort of disk 57 projecting outwardly from one side of crank pin 54; this disk is mounted at the end of a rod 58 around which is mounted under compression a lock spring 59 between two clips 60 and 61 with bearing 62 controlling the axial sliding movement of rod 58; under bearing 62 there is attached to rod 58 a plate 63 intended, if necessary, to cut off the current by contact with a sheathed fluidtight switch 64 mounted under the box 65 of electric equipment.

Regulation of the compression of spring 59 determines the initial position of plate 63 and therefore the maximum diameter of the admissible bottle that will not stop the machine.

In case of too great an oscillation of element 46 causing, by the pivoting of crank pin 54, sufficient swinging of the system to cause the clip 63 to open the switch 64, thus cutting off power to the motor (not shown) which drives the system. The person in charge of the line removes the offending bottle and the device immediately resumes operation, since element 46 is returned to its normal position.

I claim:

1. In a bottle conveying mechanism for labeling machines having a label applying turret mounted for rotation about a vertical axis, the combination including screw conveying means for moving upright bottles into engagement with the periphery of said labeling turret and for moving the bottles in synchronism with the turret while a label is being applied, said screw conveyor means including two bodies mounted for rotation about horizontal axes substantially in alignment with each other, said bodies being provided with helicoidally arranged peripheral grooves, support means at each end of the screw conveying means, said support means including yieldable means for shifting the axis of the screw conveyer means toward and away from said turret for accommodating bottles of varying diameter, means for rotating said bodies together to maintain the grooves of one body substantially as a continuation of the grooves of the other body, one of said bodies being positioned adjacent to the periphery of said labeling turret and being mounted for shiftable movement with respect to the turret, said drive means for rotating said bodies also including first rotating shaft and two intermediate shafts disposed parallel with the axis of the screw conveying means; and means connecting said shafts and conveying means for rotating the two bodies from said first shaft through said intermediate shafts, said body being rotatably supported at one end on bearing means attached to one end of a vertical crank pin, one end of one of said intermediate shafts being rotatably supported by fixed trunnion means, the other end of said crank pin being pivotally supported by said one of the intermediate shafts adjacent said fixed trunnion means.

2. The invention defined in claim 1, wherein said support means includes at least two vertical crank pins, said crank pins being mounted at one end for oscillatory pivotal movement about axes parallel with the axis of the screw conveying means, said screw conveying means being rotatably supported at the other ends of the crank pins, and means for yieldably urging the crank pins in one direction, whereby the screw conveying means will be shiftable in a horizontal plane about a horizontal axis.

3. The invention defined in claim 2, wherein one of said crank pins includes switch means for controlling a power supply for operating said mechanism, said switch means including means for disconnecting a power supply in response to a predetermined amount of shifting of the screw conveyer means.

4. The invention defined in claim 1, wherein said screw conveying means is shiftable bodily in translatory movement in a horizontal plane.

5. The invention defined in claim 1, wherein the other of said bodies is supported for shiftable movement independently of said one body, the support for the other body including a pair of crank pins disposed at the respective ends of the other body for independent shifting of the ends of said other body in a horizontal plane.

6. The invention defined in claim 1, wherein at least one said intermediate shafts is positioned below said other body and said crank pins have one of their respective ends pivotally supported on the respective ends of an intermediate shaft, said support for each crank pin including a ring attached to the shaft at one side of the crank pin, and a cap attached at the end of the shaft on the other side of each crank pin.

7. The invention defined in claim 1, wherein the support for said one body includes means for controlling a source of power for the conveying means, said controlling means including two relatively movable switch elements, one of said elements being attached to said trunnion means, the other of said elements being attached to said one of the crank pins for disconnecting said source of power in response to a predetermined shift in the position of said one body in a direction away from an adjacent labeling turret.

8. The invention defined in claim 7, wherein the support for said one body includes yieldable means for urging the body in one direction, said yieldable means including a rod pivotally connected at one end to said one crank pin and a coil spring surrounding the rod and connected between the crank pin and the trunnion, the other of said two switch elements being attached to the rod.

9. The invention defined in claim 1, wherein said screw conveying means comprises a body fabricated of yieldably flexible plastic material.

10. The invention defined in claim 9, wherein said plastic material comprises polyamide.

11. The invention defined in claim 9, wherein said plastic material comprises polytetrafluorethylene.

12. In a bottle conveying mechanism for labeling machines having a label applying turret mounted for rotation about a vertical axis, the combination including screw conveying means for moving upright bottles into engagement with the periphery of said labeling turret and for moving the bottles in synchronism with the turret while a label is being applied and support means at each end of the screw conveying means, said support means including yieldable means for shifting the axis of the screw conveyer means toward and away from said turret for accommodating bottles of varying diameter, said screw conveying means including two bodies mounted for rotation about horizontal axes substantially in alignment with each other, said bodies being provided with helicoidally arranged peripheral grooves, means for rotating said bodies together to maintain the grooves of one body substantially as a continuation of the grooves of the other body, one of said bodies being positioned adjacent to the periphery of said labeling turret and being mounted for shiftable movement with respect to the turret, said means for rotating said bodies including a drive shaft and an intermediate drive shaft, said drive shaft including universal joint and flexible bellows means at each end to permit independent shifting movement of the bodies.

* * * * *